(No Model.)
C. SCHOCH.
MACHINE FOR JOINTING AND DRESSING CIRCULAR SAWS.
No. 334,730. Patented Jan. 19, 1886.
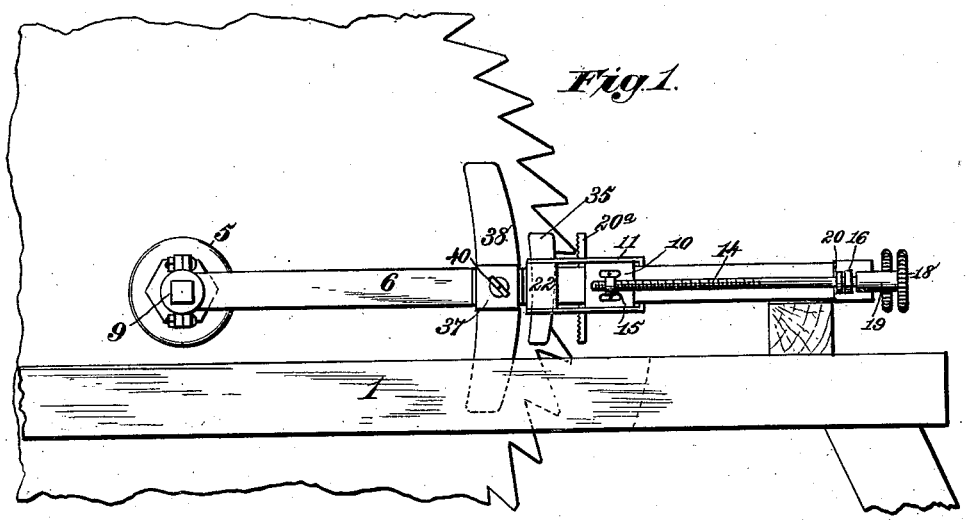
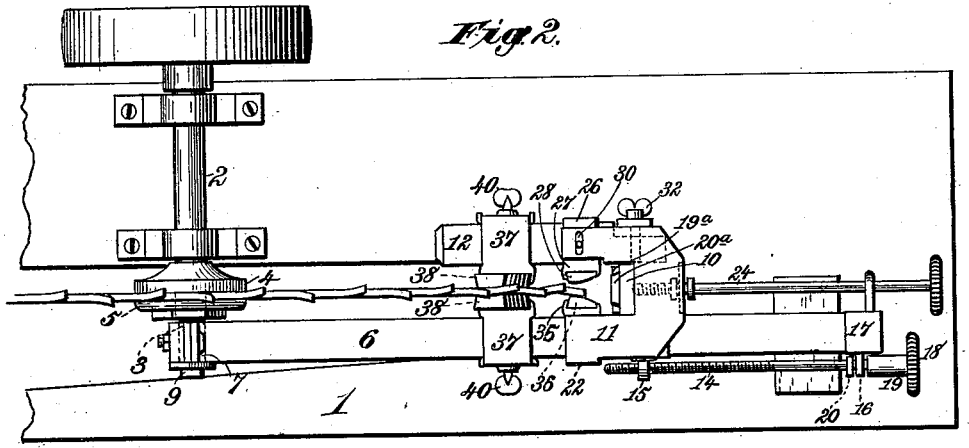
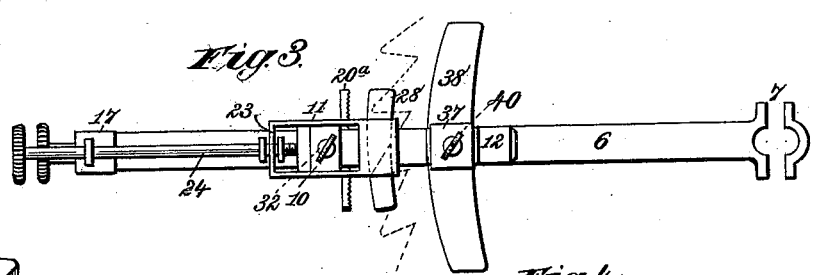
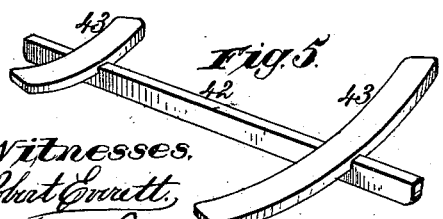
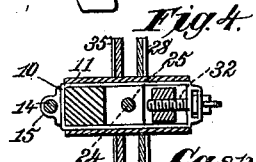
Witnesses.
Robert Emmitt
J. A. Rutherford
Inventor.
Caspar Schoch
By James L. Norris
Atty.

United States Patent Office.

CASPAR SCHOCH, OF TRUCKEE, CALIFORNIA.

MACHINE FOR JOINTING AND DRESSING CIRCULAR SAWS.

SPECIFICATION forming part of Letters Patent No. 334,730, dated January 19, 1886.

Application filed April 24, 1885. Serial No. 163,331. (No model.)

*To all whom it may concern:*

Be it known that I, CASPAR SCHOCH, a citizen of the United States, residing at Truckee, in the county of Nevada and State of California, have invented new and useful Improvements in Machines for Jointing and Dressing Circular Saws, of which the following is a specification.

This invention has for its object to furnish a machine for jointing and dressing circular saws which is simple in construction, effective in operation, and capable of performing its work with precision and dispatch, leaving the teeth of the saw uniformly jointed and dressed.

The invention consists in the construction and combination of devices, which will be hereinafter fully described, and then pointed out in the claims.

In the accompanying drawings, Figure 1 represents a side elevation of my improved machine for jointing and dressing saws as applied to a circular saw. Fig. 2 is a plan view of the same. Fig. 3 is a side elevation taken on the opposite side from that seen in Fig. 1. Fig. 4 is a cross-section taken through the part of the machine carrying the file-holders. Fig. 5 represents a gage used in setting saws to prepare the same for treatment in the jointing and dressing machine.

A bench or frame, designated by the numeral 1, has bearings or boxes for the reception of a horizontal shaft, 2, to which a rotary motion can be imparted by means of a suitable pulley or crank. This shaft has a spindle-arm, 3, at one end for the reception of the saw jointing and dressing mechanism and the circular saw to be operated upon. The saw is slipped onto said spindle-arm and made to rest against a shoulder, 4, and it is secured in place so as to rotate with the shaft 2 by means of a clamping nut or collar, 5, fitted on a screw-threaded portion of the spindle-arm adjoining the shoulder 3. The jointing and dressing mechanism is carried by a metallic arm or bar, 6, which has its inner end provided with a hub or collar, 7, adapted to encircle the spindle-arm 2, outside the nut 5, in such a manner that the arm 6 can turn or oscillate on the shaft 2 without rotating with the same.

A fastening plate or washer, 8, is fitted on the spindle-arm 3, and is secured in place by a screw, 9, so that the hub of the arm 6 will be held from moving laterally on said spindle-arm. The arm 6 is of an angular or square form, and receives two adjustable frames or file-holders, 10 and 11. The frame 10 has an angular socket or opening, through which passes the arm 6, and at its outer end it receives a short arm or bar, 12, which extends in a parallel direction to the arm 6, so as to form an opening or space between the two arms, 6 and 12, and the frame 10 for the reception of a circular saw mounted on the shaft 2. The frame 10 is free to slide on the arm 6, and for the purpose of adjusting the same I provide a screw shaft or rod, 14, which turns in a screw-threaded lug or eye, 15, on the frame 10, and has its other bearing in a lug or ear, 16, formed on a sleeve or collar, 17, arranged at the outer end of the arm 6. The screw-rod 14 terminates in a milled head, 18, and enlarged portion 19, between which and a collar, 20, the lug 16 is disposed, so as to prevent any endwise motion of the screw-shaft.

The inner side of the frame 10, at the end of the space between the two arms 6 and 12, receives a block or holder, 19ª, into which is fitted a flat file, 20ª, the latter being held in place by dovetail flanges on the block 19ª or other fastening devices. The frame 11 straddles the frame 10, and is provided with a socket or band, 22, which fits on the arm 6, and it also has an end plate, 23, carrying a rod or shaft, 24. The inner end of the latter is screw-threaded, and is seated in a fixed nut or screw-socket, 25, on the upper side of the block or file-holder 19ª. The arm 12 is made adjustable to and from the bar 6, and is provided with a band or collar, 26, having on the face adjoining the bar 6 a seat, 27, for a file, 28. This band or collar 26 is also provided with pins or lugs 29, which extend through slots 30, made in the frame 11, so as to permit the arm 12 to be moved to and from the arm 6. The adjustment of the arm 12 is effected by means of a set-screw, 32, which extends horizontally through the frame 10 and enters a socket in the bar 12, seated in a chamber of the frame 10. The socket or band 22, fitted on the arm 6, and forming part of the frame 11, is provided on its inner face with a seat, 35, which receives a file, 36. The two files carried by the arms 6 and 12 are arranged parallel to each other, and are made of a tapering shape, or, in other words, their working-faces are made beveled or slanting, the thinnest portion being at the outer end and the thickest portion at the inner end. Beyond the file-holders are arranged bands or collars 37, which carry plates 38, that are made sufficiently long to extend or lie on the faces of the saw and hold the same steady as it is revolved between the files. The bands or collars 37 are loosely fitted on the arms 6 and 12 and are held in place by set-screws 40, which, when loosened, permit the plates 38 to be moved or adjusted to suit the size of the saw or cause said plates to lie at different points on the saw.

Before referring to the operation of the above-described machine, I desire to state that the various operations necessary to bring a saw into the required working condition involve the so-called "setting," or the slanting of the teeth laterally from the plane of the saw alternately to the right and left, in order that the kerf may be wider than the thickness of the saw. Such setting operation must, in view of the position of the files in my jointing and dressing machine, be performed with great precision, so as to have all the teeth regular or true.

I use as an effective medium for determining the position of the teeth the gage seen in Fig. 5, which consists of a bar, 42, and one or more plates, 43, extending at right angles to said bar and let into the same. This gage is used by placing it against the face of the saw, so that the teeth as they are being set by a suitable swage or other implement can be trued by always causing them to touch the bar 42. The plate 43, adjoining the indicator end of the bar 42, being made sufficiently long to lie on such depressed or elevated portions of the saw as are formed during the use of the latter, it is evident that the bar 42 will enable the teeth to be set in a regular manner, notwithstanding the resistance of any irregularities in the saw. The saw having been prepared for the jointing and dressing machine, it is mounted on the proper arbor or mandrel and made to revolve between the arms 6 and 12, the flat or outer file being the one first brought into action for jointing the teeth as the saw is revolved in contact with said file. The provision of a movable frame carrying said file will permit the latter to be properly set or adjusted to suit saws of different sizes.

After the saw has been jointed the frame 10 is moved in an outward direction on the arm 6, and then the frame 11 is adjusted to bring the two files carried by the same in proper position on the sides of the saw. After having adjusted the files laterally, so as to cause them to touch the saw, it is evident that a rotation of the saw will cause said files to dress off or file the sides of the teeth. The files being made tapering or with beveled working-faces, it is evident that they will act upon the edges of the teeth as well as upon other portions thereof requiring to be dressed.

The various files employed by me are made longer than the seats in which they are fitted, so that they can be adjusted as they wear away to bring new faces into position for operation.

What I claim is—

1. The combination of a main bar having at one end a hub or collar for mounting it on the mandrel carrying the circular saw, a file-holder carried by the bar for jointing the points of the saw-teeth, two side file-holders arranged in advance of the jointing file-holder, and screw-rods for independently adjusting the file-holder and the side file-holders longitudinally on the main bar, substantially as described.

2. In a saw jointing and dressing machine, the combination of the adjustable frame carrying a jointing-file, the adjustable frame carrying a dressing-file, and the laterally-adjustable arm carrying a second dressing-file, with the main arm or bar on which the adjustable frames are mounted, and means, substantially as shown, for adjusting said frames, as and for the purpose set forth.

3. In a saw jointing and dressing machine, the combination of the adjustable collars having guide-plates, and the arms or bars on which said collars are fitted, with the adjustable frames carrying jointing and dressing files, substantially as described.

4. In a saw jointing and dressing machine, the combination of the screw shafts or rods and the collar forming outer bearings for the same, and the adjustable frames carrying files, and connected with said screw-rods, with the arm or bar adapted to be mounted on a shaft or mandrel bearing the saw to be operated upon, substantially as described.

In testimony whereof I have affixed my signature in presence of two witnesses.

CASPAR SCHOCH.

Witnesses:
 JAMES L. NORRIS,
 J. A. RUTHERFORD.